(12) United States Patent
Smith

(10) Patent No.: US 10,560,412 B2
(45) Date of Patent: Feb. 11, 2020

(54) RECIPIENT VERIFICATION

(71) Applicant: Microsoft Technology Licensing, LLC., Redmond, WA (US)

(72) Inventor: Andrew Nicholas Paul Smith, London (GB)

(73) Assignee: MICROSOFT TECHNOLOGY LICENSING, LLC, Redmond, WA (US)

( * ) Notice: Subject to any disclaimer, the term of this patent is extended or adjusted under 35 U.S.C. 154(b) by 269 days.

(21) Appl. No.: 15/273,737

(22) Filed: Sep. 23, 2016

(65) Prior Publication Data
US 2018/0091455 A1    Mar. 29, 2018

(51) Int. Cl.
*H04L 12/58*    (2006.01)
*H04L 29/08*    (2006.01)

(52) U.S. Cl.
CPC .............. *H04L 51/14* (2013.01); *H04L 51/22* (2013.01); *H04L 67/26* (2013.01)

(58) Field of Classification Search
CPC ......... H04L 51/14; H04L 51/26; H04L 67/26; H04L 51/22; H04L 67/42; H04L 51/30; G06Q 10/107
USPC ....................................................... 709/206
See application file for complete search history.

(56) References Cited

U.S. PATENT DOCUMENTS

| | | | |
|---|---|---|---|
| 6,970,908 B1 * | 11/2005 | Larky ................. | H04L 51/00 707/999.006 |
| 8,103,726 B2 | 1/2012 | Stoddard et al. | |
| 8,301,707 B1 | 10/2012 | Hebb et al. | |
| 8,719,350 B2 | 5/2014 | Sharma | |
| 8,892,672 B1 | 11/2014 | Rackliffe | |

(Continued)

FOREIGN PATENT DOCUMENTS

CA    2810686 A1    10/2013

OTHER PUBLICATIONS

"Office: Use Mail Merge to Send Personalized Email Messages to Your Email Address List", Retrieved on: Sep. 18, 2015, Available at: https://support.office.com/en-us/article/Use-mail-merge-to-send-personalized-email-messages-to-your-email-address-list-6ac6b411-ac8d-48b3-8bcb-588b460c18ff.

(Continued)

*Primary Examiner* — David R Lazaro
*Assistant Examiner* — Berhanu Shitayewoldetadik
(74) *Attorney, Agent, or Firm* — Merchant & Gould

(57) ABSTRACT

Recipient verification converses computation resources, reduces network bandwidth and reduces the amount of user input required for generating email messages that include personal salutations that are matched to the recipient's proper title, style, or honorific. The email addresses are associated with a number of recipients, gender-specific markers in names within a salutation, internal and external data sources using the email addresses (e.g., an enterprise contact server, a social network), and historical salutations to determine whether the salutation in an email message is correct for a given recipient or group of recipients. In response to detecting that the sender has not used an appropriate salutation, recipient verification is operable to suggest an appropriate salutation to a user for approval, or to automatically substitute an appropriate salutation for an inappropriate salutation in various aspects.

20 Claims, 13 Drawing Sheets

(56) References Cited

U.S. PATENT DOCUMENTS

| | | | |
|---|---|---|---|
| 2002/0099649 A1* | 7/2002 | Lee | G06Q 20/04 |
| | | | 705/38 |
| 2002/0133556 A1* | 9/2002 | Milovanovic | G06Q 10/107 |
| | | | 709/206 |
| 2004/0025048 A1* | 2/2004 | Porcari | G06Q 10/10 |
| | | | 726/1 |
| 2005/0278430 A1 | 12/2005 | Cato | |
| 2005/0289524 A1* | 12/2005 | McGinnes | G06F 8/10 |
| | | | 717/140 |
| 2006/0031348 A1* | 2/2006 | Fox | G06Q 10/10 |
| | | | 709/206 |
| 2006/0064313 A1* | 3/2006 | Steinbarth | G06Q 10/10 |
| | | | 705/322 |
| 2006/0168067 A1 | 7/2006 | Carlson et al. | |
| 2008/0077675 A1* | 3/2008 | Graef | G06Q 10/107 |
| | | | 709/206 |
| 2008/0288301 A1* | 11/2008 | Emling | G06F 16/168 |
| | | | 705/4 |
| 2009/0012823 A1* | 1/2009 | Anderson | G06Q 10/02 |
| | | | 705/5 |
| 2009/0077026 A1* | 3/2009 | Yanagihara | G06Q 10/107 |
| 2009/0100183 A1 | 4/2009 | Lam et al. | |
| 2009/0132661 A1* | 5/2009 | Kao | G06Q 10/107 |
| | | | 709/206 |
| 2009/0210504 A1 | 8/2009 | Shuster | |
| 2009/0228583 A1* | 9/2009 | Pocklington | G06Q 10/107 |
| | | | 709/224 |
| 2010/0153487 A1* | 6/2010 | Greven | G06Q 10/06311 |
| | | | 709/203 |
| 2011/0035581 A1* | 2/2011 | Maller | G06Q 10/10 |
| | | | 713/152 |
| 2011/0166886 A1* | 7/2011 | Zeringue | G06Q 10/06 |
| | | | 705/3 |
| 2011/0208778 A1* | 8/2011 | Mellmer | G06F 21/31 |
| | | | 707/783 |
| 2013/0311589 A1 | 11/2013 | Feng | |
| 2013/0318175 A1* | 11/2013 | Vasudevan | G06Q 10/107 |
| | | | 709/206 |
| 2014/0011178 A1* | 1/2014 | Rapparport | G09B 7/02 |
| | | | 434/350 |
| 2014/0222702 A1* | 8/2014 | Jennings | G06Q 30/0631 |
| | | | 705/319 |
| 2014/0280651 A1* | 9/2014 | Krugman | H04L 51/14 |
| | | | 709/206 |
| 2015/0143255 A1* | 5/2015 | Agrawal | H04L 51/28 |
| | | | 715/752 |
| 2016/0087925 A1* | 3/2016 | Kalavagattu | H04L 51/066 |
| | | | 709/206 |
| 2016/0099904 A1* | 4/2016 | Agathangelos | H04L 51/28 |
| | | | 709/206 |
| 2017/0024697 A1* | 1/2017 | Baessler | G06F 16/13 |
| 2018/0091455 A1* | 3/2018 | Smith | H04L 51/14 |

OTHER PUBLICATIONS

Dredze, et al., "Intelligent Email: Reply and Attachment Prediction", In Proceedings of the 13th international conference on Intelligent user interfaces, Jan. 13, 2018, pp. 321-324.

* cited by examiner

MOBILE COMPUTING DEVICE

RECIPIENT VERIFICATION

BACKGROUND

Email is a widely adopted tool for communicating electronically with another person. Users frequently begin email messages with a salutation, which may include the recipient's name. In languages that include gender-specific and earned honorifics (e.g., Mr./Ms./Mrs., ranks, educational degrees, titles) that may be applied to recipients, senders of email messages may inadvertently use incorrect salutations, especially when the recipients is unfamiliar to the sender. This may lead to persons of one gender being referred to by salutations appropriate for another gender, the sender showing an inappropriate amount of respect for the recipient, or the sender using an awkward or impersonal salutation, such as, for example, "to whom it may concern". The incorrect usage of personal salutations is particularly prevalent when using mail merge operations, which can incorporate honorifics from one message into another—despite the fact that the persons addressed should be addressed by different honorifics.

SUMMARY

This summary is provided to introduce a selection of concepts in a simplified form that are further described below in the Detailed Description section. This summary is not intended to identify all key or essential features of the claimed subject matter, nor is it intended as an aid in determining the scope of the claimed subject matter.

Recipient verification provides users with enhanced tools and services for including proper salutations in emails by associating salutation information with recipient email addresses. The email addresses are associated with a number of recipients, gender-specific markers in names within a salutation, internal and external data sources using the email addresses (e.g., an enterprise contact server, a social network), and historical salutations to determine whether the salutation in an email message is correct for a given recipient or group of recipients. In response to detecting that the sender has not used an appropriate salutation, recipient verification is operable to suggest an appropriate salutation to a user for approval, or to automatically substitute an appropriate salutation for an inappropriate salutation in various aspects.

The present disclosure increases the efficiency of a computing system practicing it by improving the accuracy of content within a message prior to communicating the message, thereby conserving computation resources and reducing network bandwidth that are typically experienced in addressing the inaccuracies. The present disclosure also increases the efficiency of a computing system practicing it my reducing the amount of user input required to generate messages with personal salutations, thereby conserving computation resources in handling user input.

Examples are implemented as a computer process, a computing system, or as an article of manufacture such as a device, computer program product, or computer readable medium. According to an aspect, the computer program product is a computer storage medium readable by a computer system and encoding a computer program comprising instructions for executing a computer process.

The details of one or more aspects are set forth in the accompanying drawings and description below. Other features and advantages will be apparent from a reading of the following detailed description and a review of the associated drawings. It is to be understood that the following detailed description is explanatory only and is not restrictive of the claims.

BRIEF DESCRIPTION OF THE DRAWINGS

The accompanying drawings, which are incorporated in and constitute a part of this disclosure, illustrate various aspects. In the drawings.

DETAILED DESCRIPTION

Figure 1:
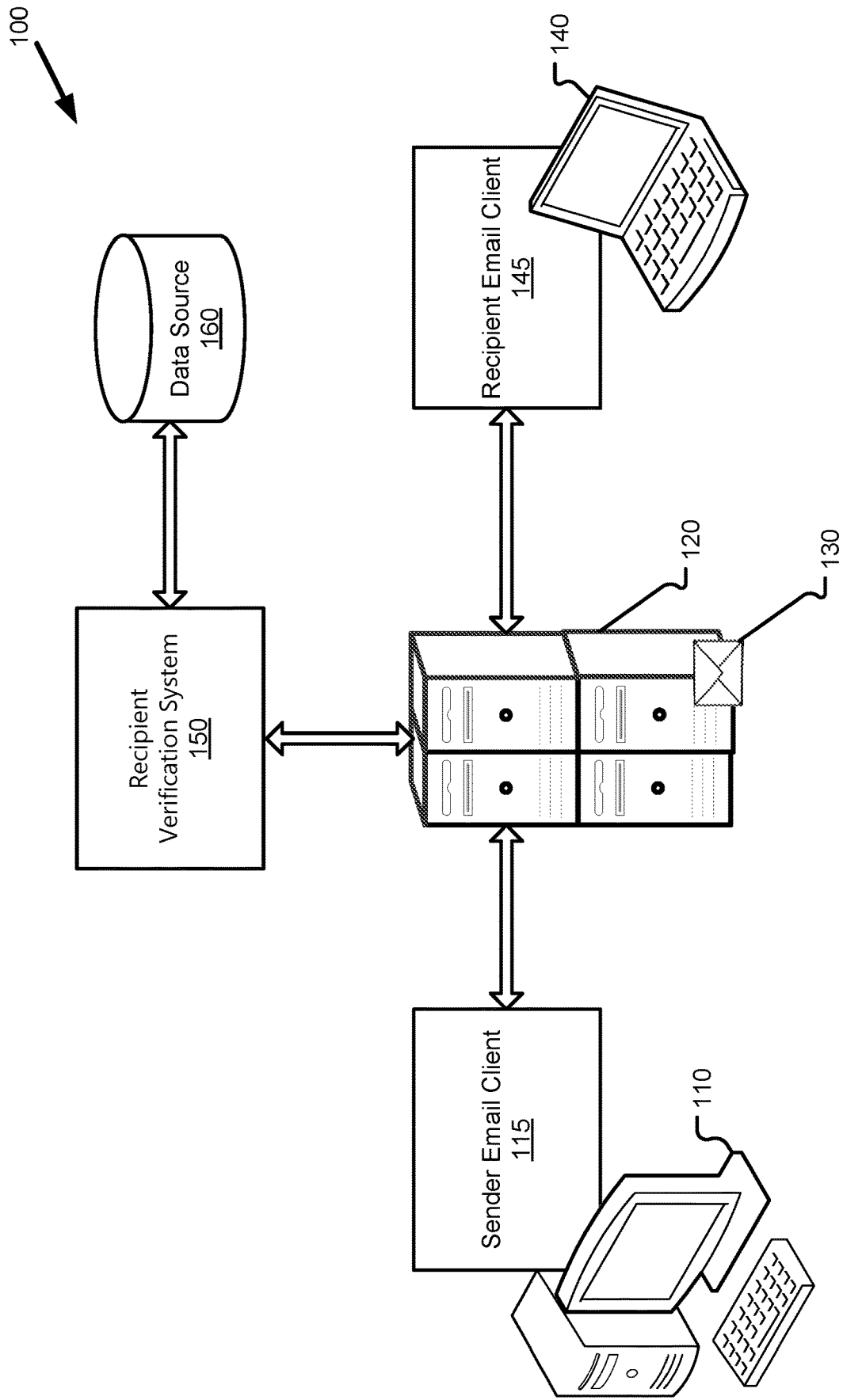
FIG. 1 is an example environment in which recipient verification is implemented.

The following detailed description refers to the accompanying drawings. Wherever possible, the same reference numbers are used in the drawings and the following description refers to the same or similar elements. While examples may be described, modifications, adaptations, and other implementations are possible. For example, substitutions, additions, or modifications may be made to the elements illustrated in the drawings, and the methods described herein may be modified by substituting, reordering, or adding stages to the disclosed methods. Accordingly, the following detailed description is not limiting, but instead, the proper scope is defined by the appended claims. Examples may take the form of a hardware implementation, or an entirely software implementation, or an implementation combining software and hardware aspects. The following detailed description is, therefore, not to be taken in a limiting sense.

Recipient verification provides users with enhanced tools and services for including proper salutations in emails by associating salutation information with recipient email addresses. The email addresses are associated with a number of recipients, gender-specific markers in names within a salutation, internal and external data sources using the email addresses (e.g., an enterprise contact server, a social network), and historical salutations to determine whether the salutation in an email message is correct for a given recipient or group of recipients. In response to detecting that the sender has not used an appropriate salutation, recipient verification is operable to suggest an appropriate salutation to a user for approval, or to automatically substitute an appropriate salutation for an inappropriate salutation in various aspects.

Recipient verification increases the efficiency of a computing system practicing it by improving the accuracy of content within a message prior to communicating the message, thereby conserving computation resources and reducing network bandwidth that are typically experienced in addressing the inaccuracies. Recipient verification also increases the efficiency of a computing system practicing it my reducing the amount of user input required to generate messages with personal salutations, thereby conserving computation resources in handling user input.

FIG. 1 is an example environment 100 in which recipient verification is implemented. As illustrated, a sender computing device 110 is running a sender email client 115, which communicates with server 120 to send an email message 130 to be received by a recipient computing device 140 via a recipient email client 145. Various email servers 120 and intermediaries may lie between the sender machine 110 and the recipient machine 140 to route the email message 130 between the sender and the recipient.

The server 120 communicates with a recipient verification system 150 to provide verification functionality for the email message 130. The recipient verification system 150 performs an analysis of the email message 130 to determine whether the recipient is accurately identified in the email message 130. The recipient verification system 150 is configured to interrogate a data source 160 for information relating to the recipient. The data source 160 is illustrative of any local resource or external resource that includes information relating to recipient including, without limitation, user contacts, email threads, a user specific database including information associated with senders and recipients of emails, a network database including information associated with senders and recipients of emails, the sender's previous emails to/from the recipient, instant messages, appointments, documents, and/or newsgroups. Additionally, according to certain aspects, the recipient verification system 150 is configured to interrogate a third-party data sources 160 including, without limitation: webpages; telecommunications platforms, for example Skype® (offered by Skype Technologies S.A.R.L. of Luxembourg City, Luxembourg); and social media networks, for example, Facebook® (offered by Facebook, Inc. of Menlo Park, Calif.), LinkedIn® (available from LinkedIn Corp. of Mountain View, Calif.) and/or MySpace® (available from MySpace LLC of Beverly Hills, Calif.). While the recipient verification system 150 is shown remotely from the sender computing device 110 or the server 120 for illustrative purposes, it should be noted that the recipient verification system 150 is suitable in several configurations including, without limitation, a separate system hosted by the sender computing device 110 or the server 120, an integral aspect of the sender computing device 110 or the server 120, or a remote server.

The sender computing device 110 and recipient computing device 140 are illustrative of a computing systems including, without limitation, desktop computer systems, wired and wireless computing systems, mobile computing systems (e.g., mobile telephones, netbooks, tablet or slate type computers, notebook computers, and laptop computers), hand-held devices, multiprocessor systems, microprocessor-based or programmable consumer electronics, minicomputers, and mainframe computers. The hardware of these computing systems is discussed in greater detail in regard to FIGS. 6, 7A, 7B, and 8. In various aspects, the sender computing device 110 and recipient computing device 140 are accessed locally and/or by a network, which may include the Internet, a Local Area Network (LAN), a private distributed network for an entity (e.g., a company, a university, a government agency), a wireless ad hoc network, a Virtual Private Network (VPN) or other direct data link (e.g., Bluetooth connection, a direct wired link).

The sender email client 115 and the recipient email client 145 used to send and receive the email message 130 are illustrative of a productivity application used to send and receive email, including, without limitation, local applications and cloud-based applications, such as for example: Gmail™ (offered by Alphabet, Inc.), Thunderbird® (offered by the Mozilla Foundation of Mountain View, Calif.), or Outlook® (available from Microsoft Corp. of Redmond, Wash.). In various aspects, the sender email client 115 and the recipient email client 145 may be different instances of the same application or program, or they may be unique instances of different applications or programs.

The email message 130 may be composed, formatted, transmitted, and received according to various standards (and various versions thereof), including, but not limited to: POP (Post Office Protocol), IMAP (Internet Message Access Protocol), MIME (Multipurpose Internet Mail Extension), SMTP (Simple Mail Transfer Protocol), HTML (Hypertext Markup Language), Rich Text, Plain Text, etc.

Figure 2:
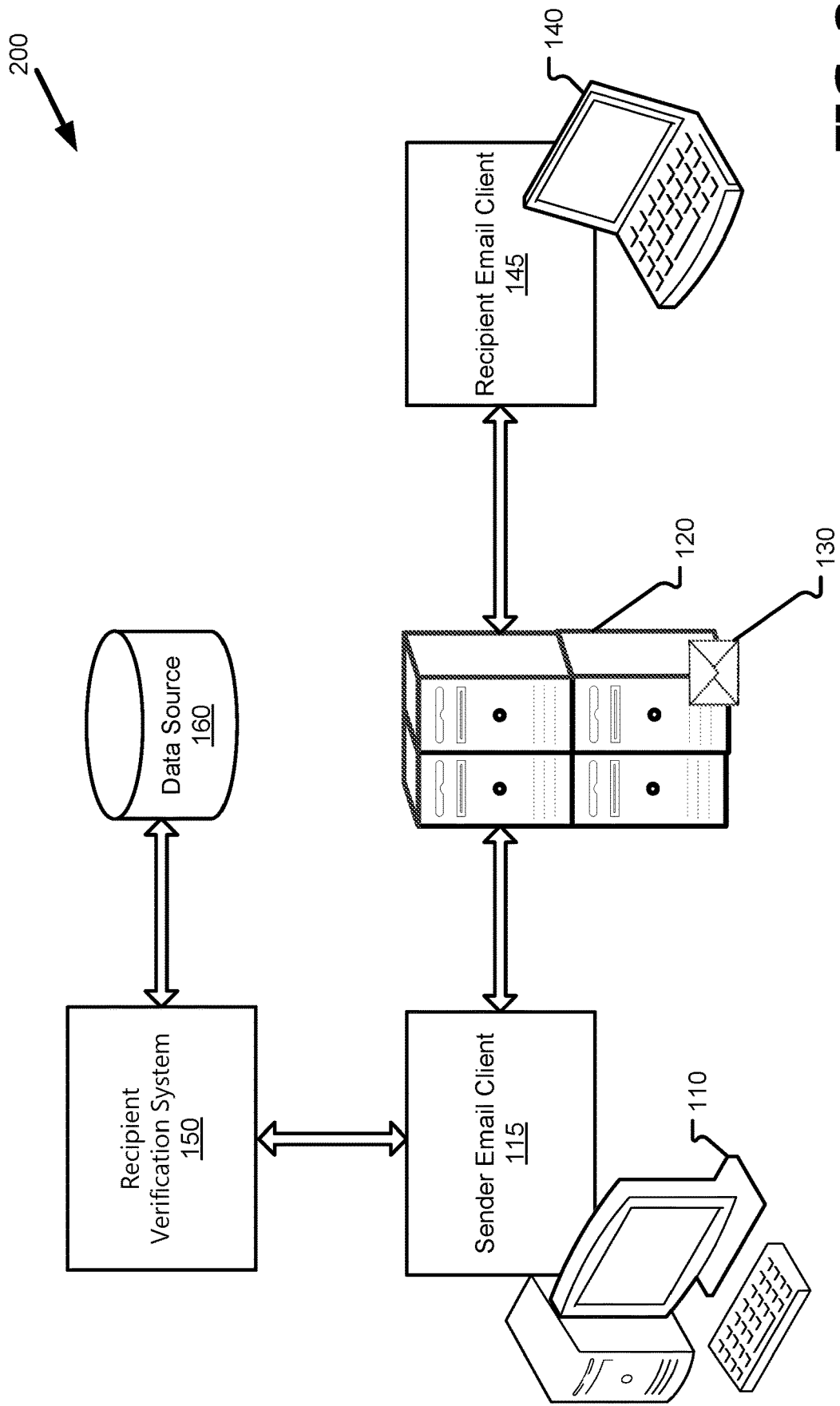
FIG. 2 is an example environment in which recipient verification may be implemented.

FIG. 2 is an example environment 200 in which recipient verification may be implemented. As illustrated, a sender computing device 110 is running a sender email client 115, which communicates with a server 120 to send an email message 130 to be received by a recipient computing device 140 via a recipient email client 145. Further, the sender email client 115 on the sender computing device 110 communicates with a recipient verification system 150 to provide verification functionality for the email message 130. While the recipient verification system 150 is shown remotely from the sender email client 115 for illustrative purposes, it should be noted that the recipient verification system 150 is suitable for implementation as an integral feature of the sender email client 115 or an add-on feature of the sender email client 115. For example, according to one aspect, the recipient verification system 150 is a plug-in software component of the sender email client 115.

Figure 3:
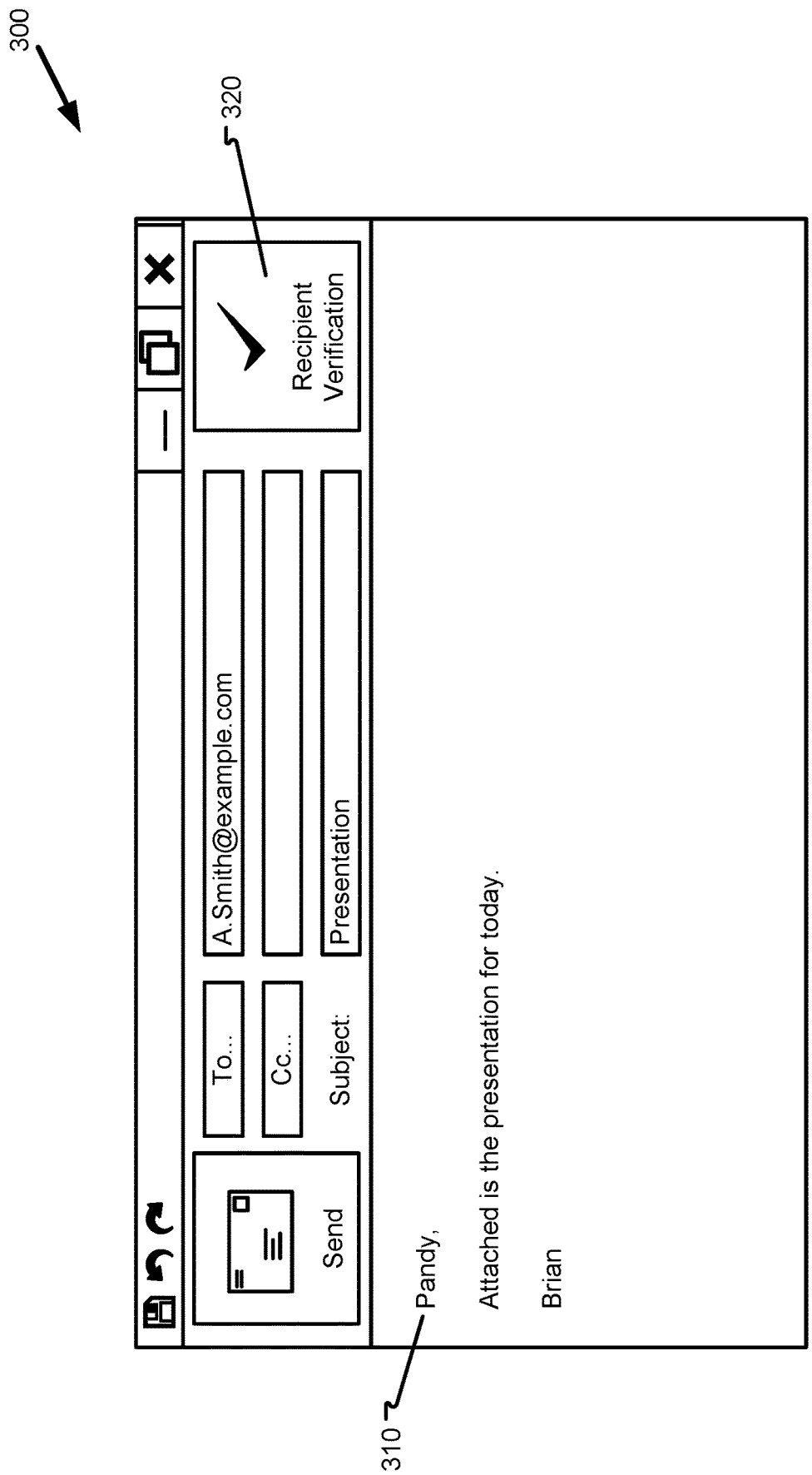
FIG. 3 illustrates aspects of recipient verification including a example control within a messaging application.

FIG. 3 illustrates aspects of recipient verification including an example user interface 300 for an email client. As will be appreciated, the user interfaces illustrated and discussed are explanatory, and do not limit the scope of the present disclosure in the inclusion or exclusion of discussion of various components; one of ordinary skill in the art will appreciate additional elements that may be added or elements that may be removed or rearranged without departing from the scope of the present disclosure.

As illustrated, the user interface 300 is an email message composing user interface. The email message composing user interface includes various email client controls for addressing, sending, saving, labeling, etc., the email message 130. Similarly, a message authoring panel may also be provided for the sending user to author an email message 130, including text enrichment controls (e.g., bold, italic, underline, text color, text size, typeface). One of ordinary skill in the art will be familiar with email client controls and other message authoring panels in the context of an email client. In the illustrated example, the email message composing user interface illustrates a draft email message 310 addressed to "A.Smith@example.com" relating to the subject "Presentation." Further, the body of the draft email message 310 includes a salutation, which identifies the recipient as "Pandy," the email body, and a signature.

The email client also provides one or more ways to initiate functionality associated with the recipient verification system 150. According to an aspect, the email client initiates the functionality associated with the recipient verification system 150 based on a user's interaction with the email client. In the illustrated example, the email message composing user interface includes a recipient verification control 320. Actuation of the recipient verification control 320 causes the email client to execute the functionality associated with the recipient verification system 150. In another example, the functionality associated with the recipient verification system 150 is automatically initiated when the user selects to send the draft email message 310.

FIGS. 4A-4E illustrate aspects of recipient verification including example notifications 401-405 within an email client. As will be appreciated, the user interfaces illustrated and discussed are explanatory, and do not limit the scope of the present disclosure in the inclusion or exclusion of discussion of various components. One of ordinary skill in the art will appreciate additional elements that may be added or elements that may be removed or rearranged from those shown in FIGS. 4A-4E without departing from the scope of the present disclosure.

Figure 4A:
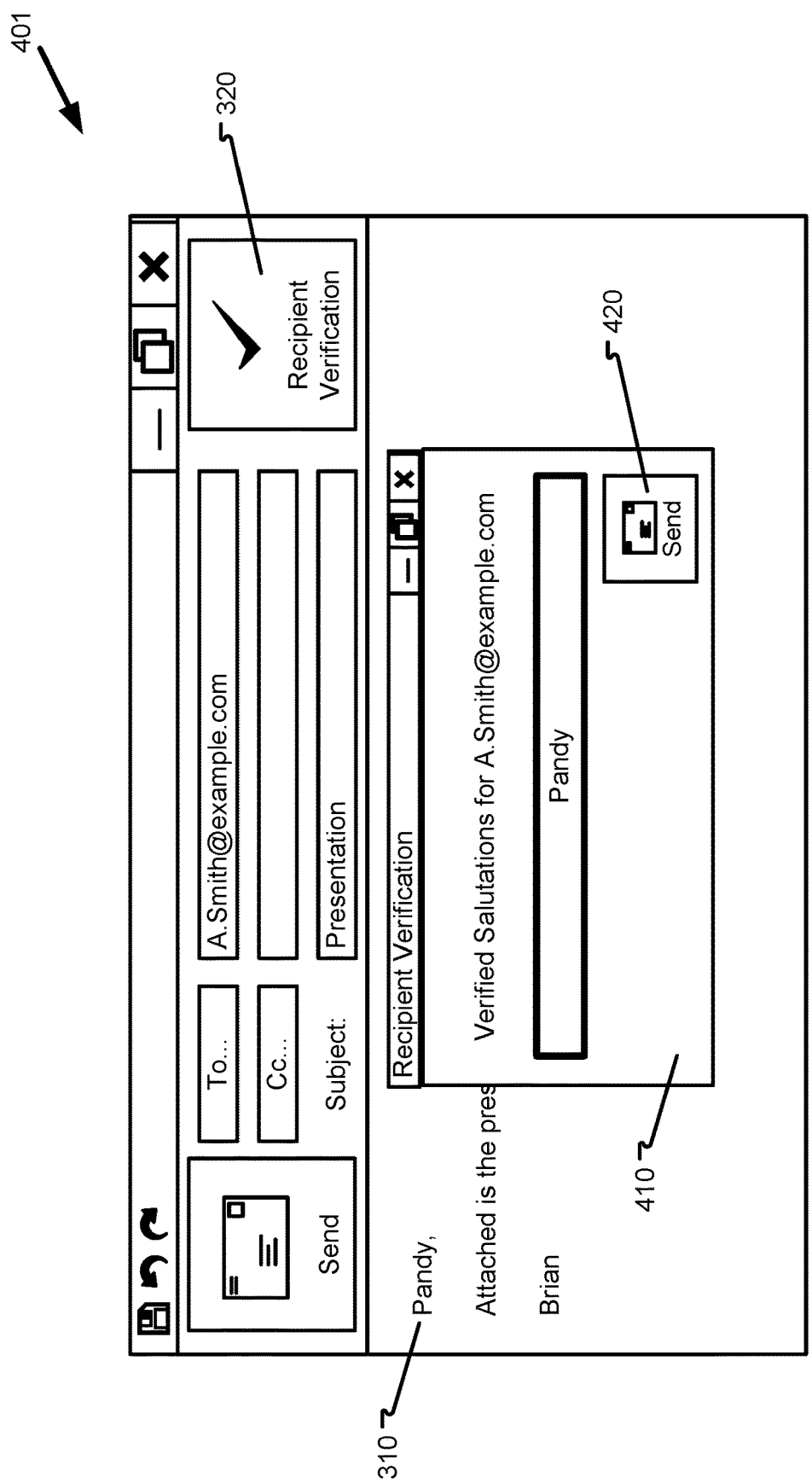
FIGS. 4A-4E illustrate aspects of recipient verification including example notifications within a messaging application.

FIG. 4A illustrates aspects of recipient verification including an example notification 401 within the email client. More particularly, the example notification 401 is a popup window 410 that is displayed over the email message composing user interface. However, it should be appreciated that the example notification 401 may otherwise be presented to the user including, without limitation, a banner notification, a dashboard notification, a toast notification, a dialog notification, a status notification, etc. According to one aspect, the example notification 401 that the email address and salutation have been verified. For example, with reference to the draft email 310 message in FIG. 3, FIG. 4A illustrates an alert to inform the sender that "Pandy" is a verified salutation for "A.Smith@example.com." Additionally, the illustrated notification 401 includes a functionality control 420 to confirm the request to send the draft email message 310 as the email message 130. According to another aspect, the email client automatically sends the draft email message 310 without a notification when the email address and salutation are verified.

Figure 4B:
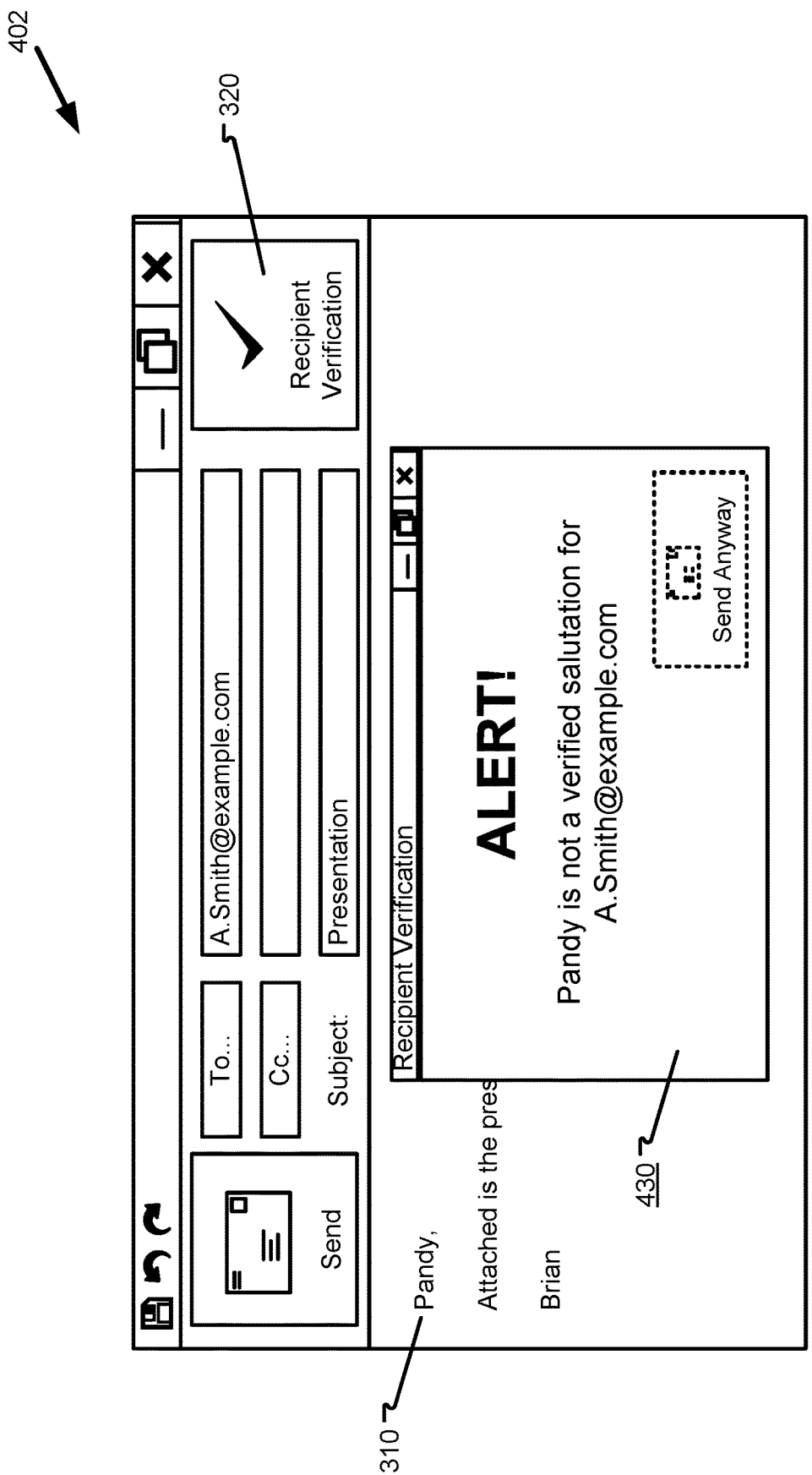

FIG. 4B illustrates aspects of recipient verification including an example notification 402 within the email client. With reference to the draft email message 310 in FIG. 3, the example notification 402 illustrates an alert 430 to inform the sender that "Pandy" is not a verified salutation for "A.Smith@example.com." After receiving the notification 402, the user has one or more options to address the notification 402. According to one aspect, the user dismisses the notification 402 and returns to the email message composing user interface where the user is able to modify the salutation and/or draft email message 310. In response to the user making edits and subsequently initiating the functionality associated with the recipient verification system 150 (e.g., clicking send, etc.), the draft email message 310 is sent as the email message 130 when the salutation is verified or another notification is presented when the salutation is not verified. In accordance with certain aspects of the email client, the salutation must be verified before sending the email message 130. According to other aspects, the notification optionally includes a functionality control to send the email message 130 despite the alert 430.

Figure 4C:
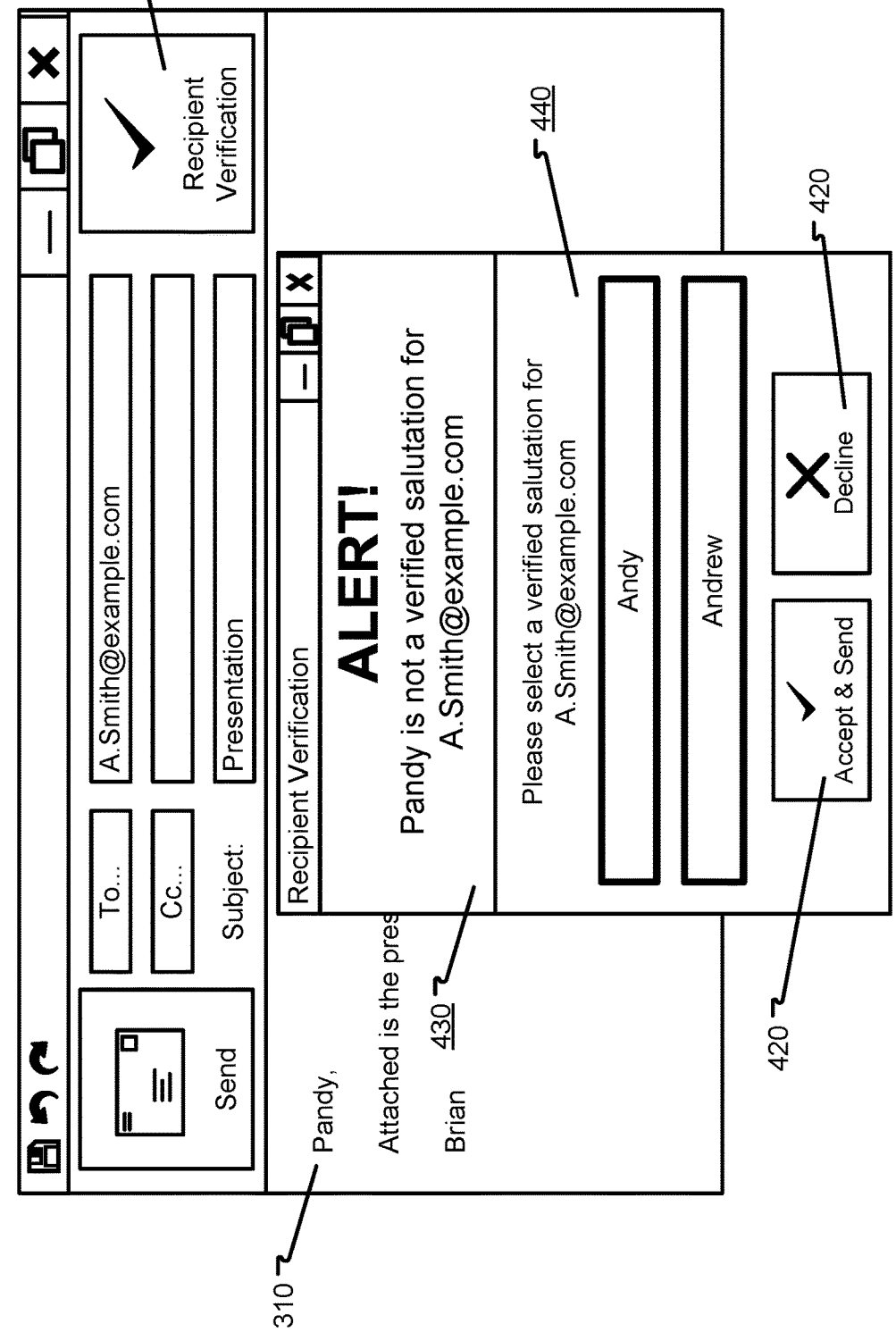

FIG. 4C illustrates aspects of recipient verification including an example notification 403 within the email client. With reference to the draft email message 310 in FIG. 3, the example notification 403 illustrates an alert 430 to inform the sender that "Pandy" is not a verified salutation for "A.Smith@example.com." According to one aspect, the notification 403 includes a user interface to provide verified salutations associated with the email address. For example, in the illustrated notification, the notification displays a prompt 440 requesting a selection of a verified salutation for "A.Smith@example.com," namely "Andy" and "Andrew." Further, the illustrated notification includes functionality controls 420 to "Accept & Send" using one of the verified salutations and to "Decline" using either of the displayed verified salutations. Upon selection of one of the verified salutations and a receiving a selection of "Accept & Send," the email salutation is replaced with the selected verified salutation and the email message 130 is sent. Upon selection of an option to decline the verified salutation, the email client returns to the email message composing user interface where the user is able to modify the salutation and/or draft email message 310.

Figure 4D:
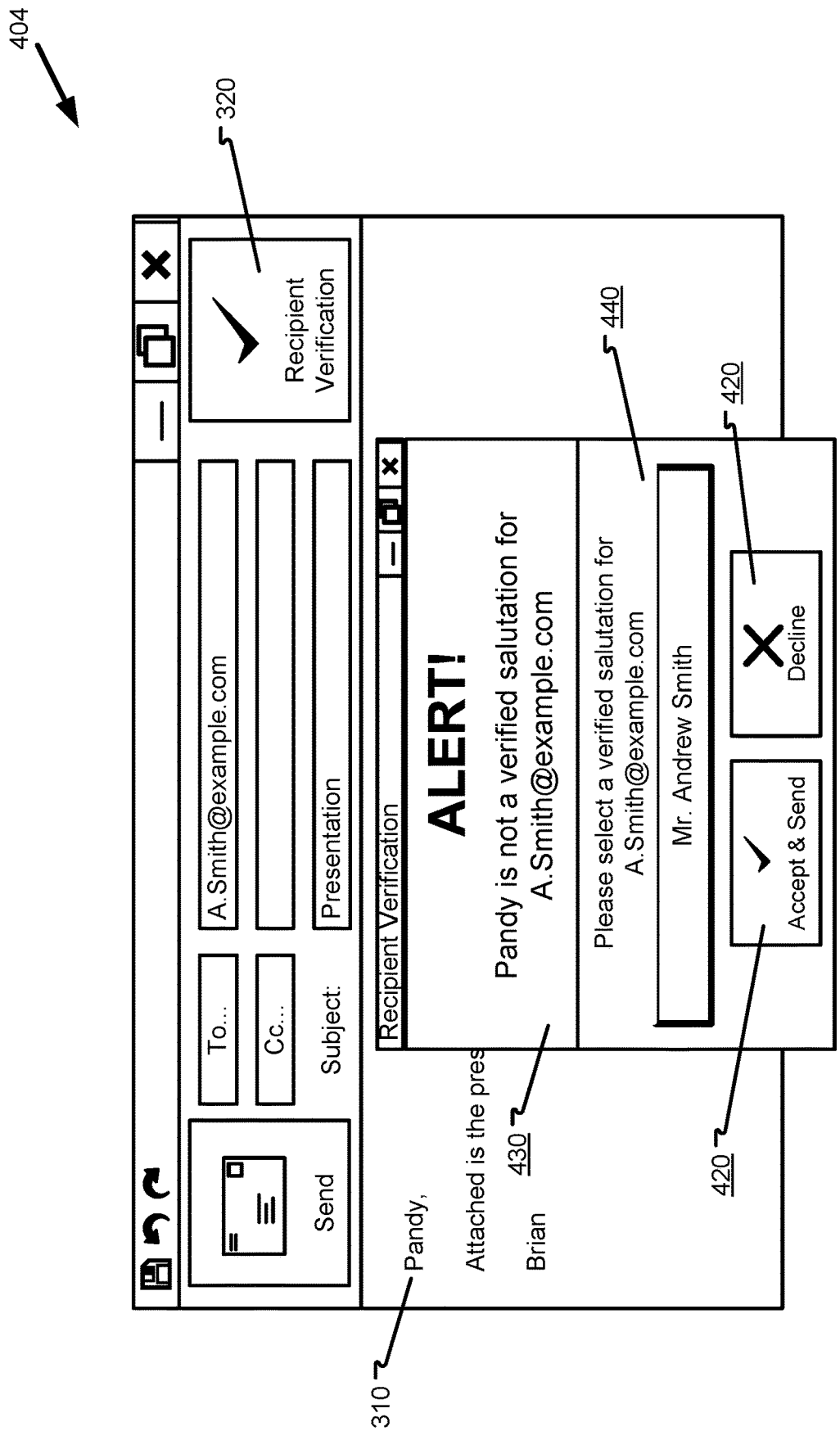

FIG. 4D illustrates aspects of recipient verification including an example notification 404 within the email client. With reference to the draft email message 310 in FIG. 3, the example notification 404 illustrates an alert 430 to inform the sender that "Pandy" is not a verified salutation for "A.Smith@example.com." According to one aspect, the notification 404 includes a user interface to provide verified salutations with a correct style, title, or honorific. For example, in the illustrated notification, the notification displays a prompt 440 requesting a selection of verified salutation for "A.Smith@example.com," namely "Mr. Andrew Smith." As previously discussed, the illustrated notification 404 includes functionality controls 420 to "Accept & Send" using one of the verified salutations and to "Decline" using the displayed verified salutations. Upon selection a verified salutation and receiving a selection of "Accept & Send," the email salutation is replaced with the selected verified salutation and the email message 130 is sent. Upon selection of an option to decline the verified salutation, the email client returns to the email message composing user interface where the user is able to modify the salutation and/or draft email message 310.

Figure 4E:
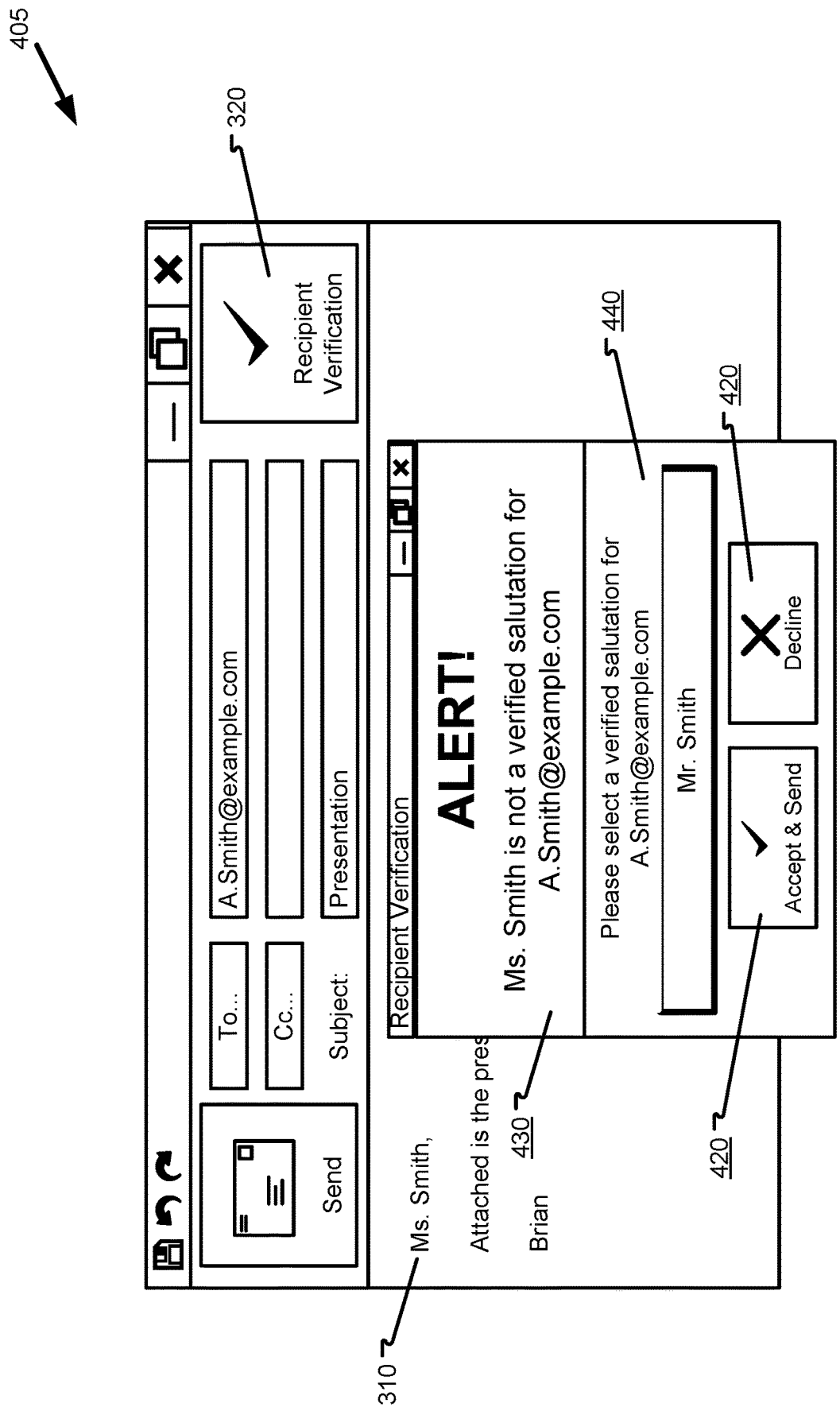

FIG. 4E illustrates aspects of recipient verification including an example notification 405 within the email client. In the illustrated example, the notification 405 includes an alert 430 to inform the sender that "Ms. Smith" is not a verified salutation or a verified style/title/honorific for "A.Smith@example.com." According to one aspect, the notification 405 includes an alert 430 with a user interface to provide verified salutations with a verified style/title/honorific. For example, in the illustrated alert 430, the notification 405 displays a prompt 440 requesting a selection of verified salutation for "A.Smith@example.com," namely "Mr. Smith." As previously discussed, the illustrated alert 430 includes functionality controls 420 to "Accept & Send" using one of the verified salutations and to "Decline" using a displayed verified salutation. Upon selection of a verified salutations and a receiving a selection of "Accept & Send," the email salutation is replaced with the selected verified salutation and the email message 130 is sent. Upon selection of an option to decline the verified salutation, the email client returns to the email message composing user interface where the user is able to modify the salutation and/or draft email message 310.

Figure 5:
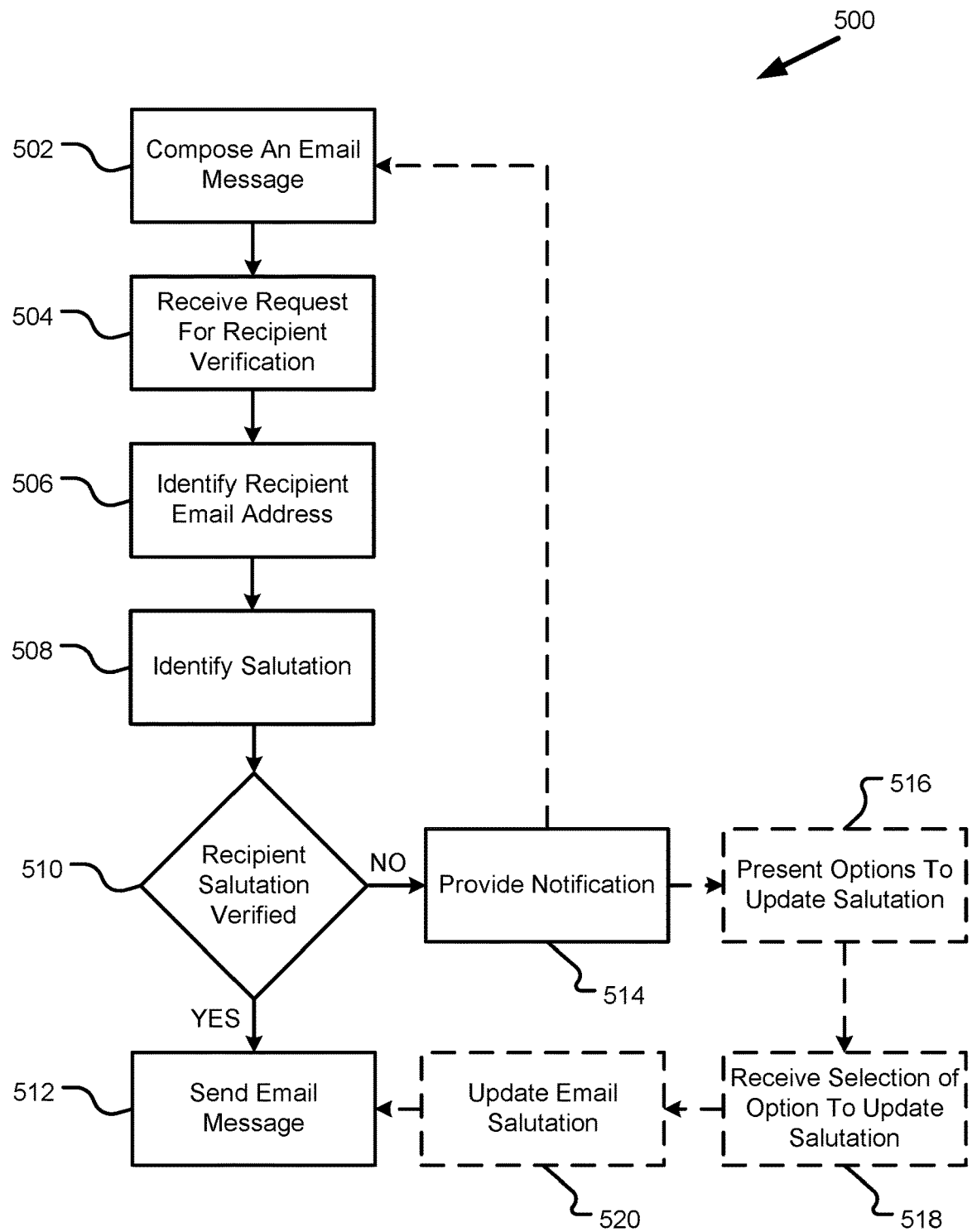
FIG. 5 illustrates a flowchart showing general stages involved in an example method for providing a recipient verification system.

FIG. 5 is a flowchart showing general stages involved in an example method 500 for providing a recipient verification system 150. Method 500 begins at OPERATION 502 where the user composes an email message 130. In one example, with reference to FIG. 3, the user is utilizing a messaging client that includes an email message composing user interface that allows a user to compose an email message 130. In most situations, the email message 130 includes an email address, a salutation, an email body, and a signature.

Method 500 then proceeds to OPERATION 504, where the sender email client 115 receives a request for recipient verification. Generally, the sender email client 115 initiates the recipient verification functionality based on the user's interaction with the sender email client 115. In one example, the functionality associated with the recipient verification system 150 is automatically initiated when the user selects to send the email message 130. In another example, the email message composing user interface may include a control (e.g., a button) that causes the sender email client 115 to initiate the recipient verification functionality. It should be recognized that the sender email client 115 may provide other ways for the user to initiate the recipient verification.

Method 500 then proceeds to OPERATION 506, where the sender email client 115 identifies a recipient email address. According to one aspect, the email message 130 is parsed for contact information associated with the recipient. It should be recognized that the contact information parsed from email message 130 includes one or more attributes including, without limitation, a name associated with the recipient contact profile, a user name, a domain name, or a text string. According to another aspect, the sender email client 115 analyzes the header to identify the recipient email address. In one example, the sender email client 115 identifies the recipient email address within the email address header field.

According to other aspects, OPERATION 506 includes functionality to determine whether contact information relating to the recipient's email address identifies a masculinity attribute or a femininity attribute. As discussed above, the contact information parsed from email message 130 may include an attribute, such as "Andrew" in Andrew@example.com, which identifies a masculinity attribute associated with the recipient's email address.

At OPERATION 508 the sender email client 115 identifies the salutation. According to one aspect, the email message 130 is parsed for a salutation associated with the recipient. As identified in FIGS. 4A-4E, an example salutation for "A.Smith@example.com" includes Andy, Andrew, Pandy, Mr. Andrew Smith, Mr. Smith, etc. According to other aspects, OPERATION 508 includes functionality to determine whether salutation identifies a masculinity attribute or a femininity attribute. As discussed above, the contact information parsed from email message 130 includes an attribute, such as "Andrew" in "Andrew@example.com", which identifies a masculinity attribute associated with the recipient's email address.

Method 500 then proceeds to DECISION 510, where it is determined whether the recipient's salutation is verified. More particularly, DECISION 510 determines whether the identified salutation is a verified salutation for the identified recipient's email address. The verification of the salutation may rely on various types of information.

According to one aspect, the verification functionality relies on the identified recipient email address and the identified salutation.

According to another aspect of DECISION 510, one or more libraries are evaluated in the determination of whether the recipient salutation is verified. In one example, the recipient salutation verification utilizes a global library, which identifies common salutations for common names, nicknames, etc., to determine whether the identified salutation is a verified salutation for the identified recipient's email address. In another example, the recipient salutation verification utilizes a user-defined library, which identifies user-defined salutations, user-defined names, user-defined nicknames, etc. to determine whether the identified salutation is a verified salutation for the identified recipient's email address. The user-defined library includes a learned database of names, nicknames, salutations and other recipient information that is derived from the sender's previous correspondence. Further, it should be recognized that the user-defined library is updated to reflect instances when the salutation is incorrectly flagged as unverified and the sender sends the email message 130.

According to yet another aspect of DECISION 510, previous correspondence is evaluated in determining whether the recipient salutation is verified. In one example, the recipient salutation verification accesses previously sent and/or received messages. The previously sent and/or received messages are parsed for contact information associated with the recipient. It should be recognized that the contact information parsed from email message 130 includes one or more attributes including, without limitation, a name associated with the recipient contact profile, carbon copied users, user names, domain names, or text strings. Further, it should be recognized that message threads may provide an immense amount of contact information throughout the messages comprising the thread.

Further, in accordance with another aspect of DECISION 510, additional data sources 160 are utilized in the determination of whether the recipient salutation is verified. More particularly, various types of data sources 160 are accessible for providing additional information about the recipient. In one example, the sender email client 115 is operable to evaluate salutations and other contact information from other platforms (such as Skype or another messenger application) and update the user-defined library with the salutations and other contact information. Further, the sender email client 115 is operable to utilize various API's in order to interrogate other data sources 160. In one example, the sender email client 115 is operable to interrogate third-party data sources, including social networks (e.g., LinkedIn, Facebook, etc.) to identify names, salutations or other contact information.

According to another aspect of DECISION 510, the verification functionality evaluates the masculinity attributes or the femininity attributes that were identified in OPERATION 504 and OPERATION 506 above. For example, the recipient's salutation is determined to be invalid when the masculinity attributes or the femininity attributes conflict. In other examples, DECISION 510 utilizes data sources 160 to determine whether recipient's salutation is verified. In one example, the sender email client 115 is operable to interrogate third-party data sources 160, including social networks (e.g., LinkedIn®, Facebook®, etc.) to identify masculinity attributes or femininity attributes.

When the recipient is verified, method 500 then proceeds to OPERATION 512, where the sender email client 115 sends the email message 130. Optionally, method 500 may provide a notification prior to sending the email message 130, such as the example notification 401 shown in FIG. 4A, which indicates that the salutation was verified for the email address.

When the recipient is not verified, method 500 then proceeds to OPERATION 514, where the sender email client 115 provides a notification to the sender. In the example notification 402 shown in FIG. 4B, the email client displays an alert 430 that the current salutation is not a verified salutation for the current email address. In response to receiving the alert notification, the method 500 optionally returns to OPERATION 502 to receive further edits to the email message 130 or salutation from the user.

According to other aspects, the notification may provide additional information for resolving the conflict between the email address and the salutation. For example, at OPTIONAL OPERATION 516 the sender email client 115 presents options to update the salutation. In one example, the notification displays a prompt 440 to select a verified salutation for the email address. Specifically, the notification includes one or more verified salutations derived from the contact information located in a data source 160, such as contact information from the global library or the user-defined library. Further, the notification provides the sender with the option to select one of the verified salutations and control functions 420 to "Accept & Send" or "Decline." At OPTIONAL OPERATION 518 the sender email client 115 receives a selection of an option to update the salutation. For example, with respect to OPTIONAL OPERATION 518, the sender email client 115 receives a selection of a verified salutation and a selection of a control function 420. At OPTIONAL OPERATION 520 the sender email client 115 updates the salutation in the email message 130 based on the selected verified salutation and proceeds to OPERATION 512, where the sender email client 115 sends the email message 130.

Figure 6:
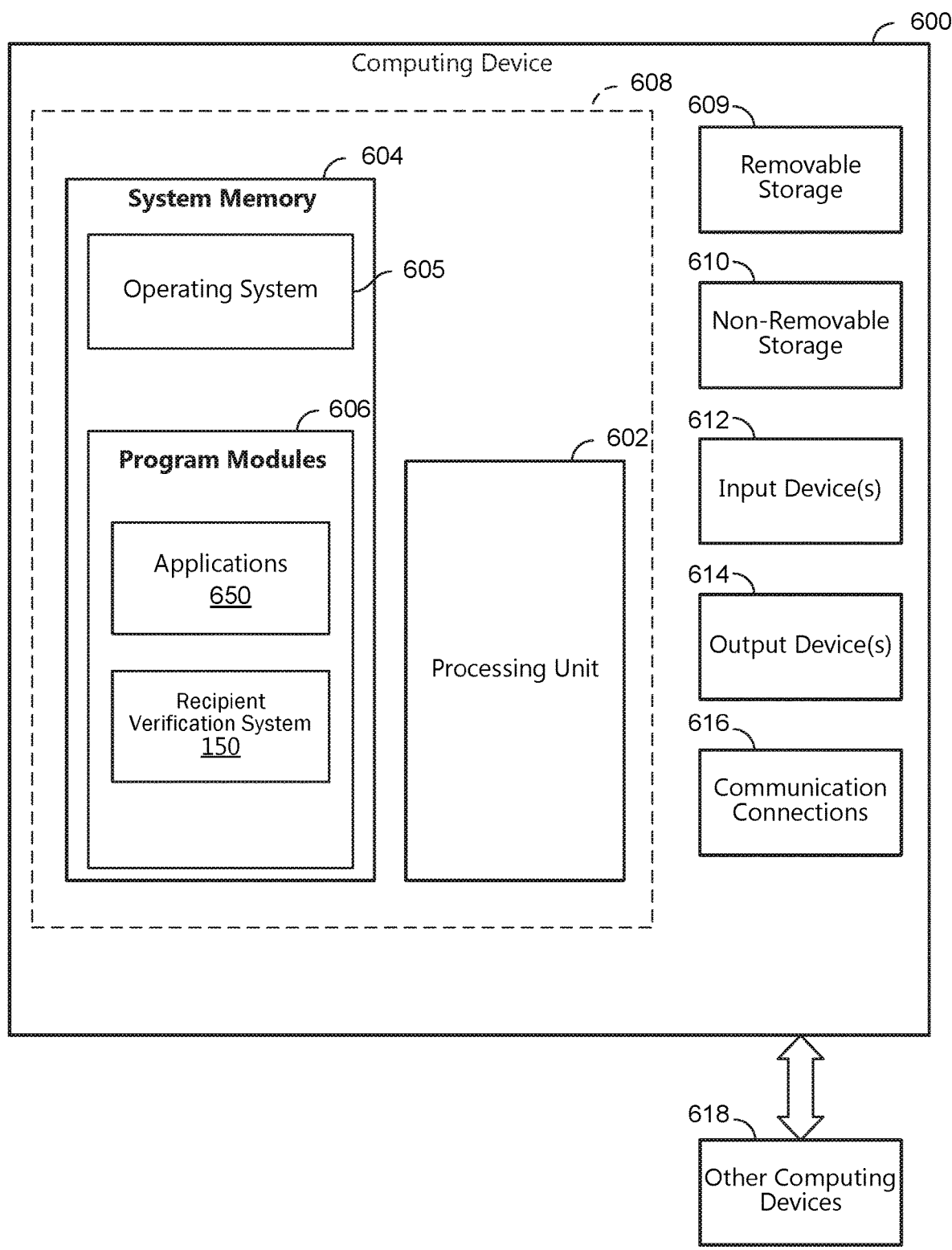
FIG. 6 is a block diagram illustrating example physical components of a computing device.
Figure 7A:
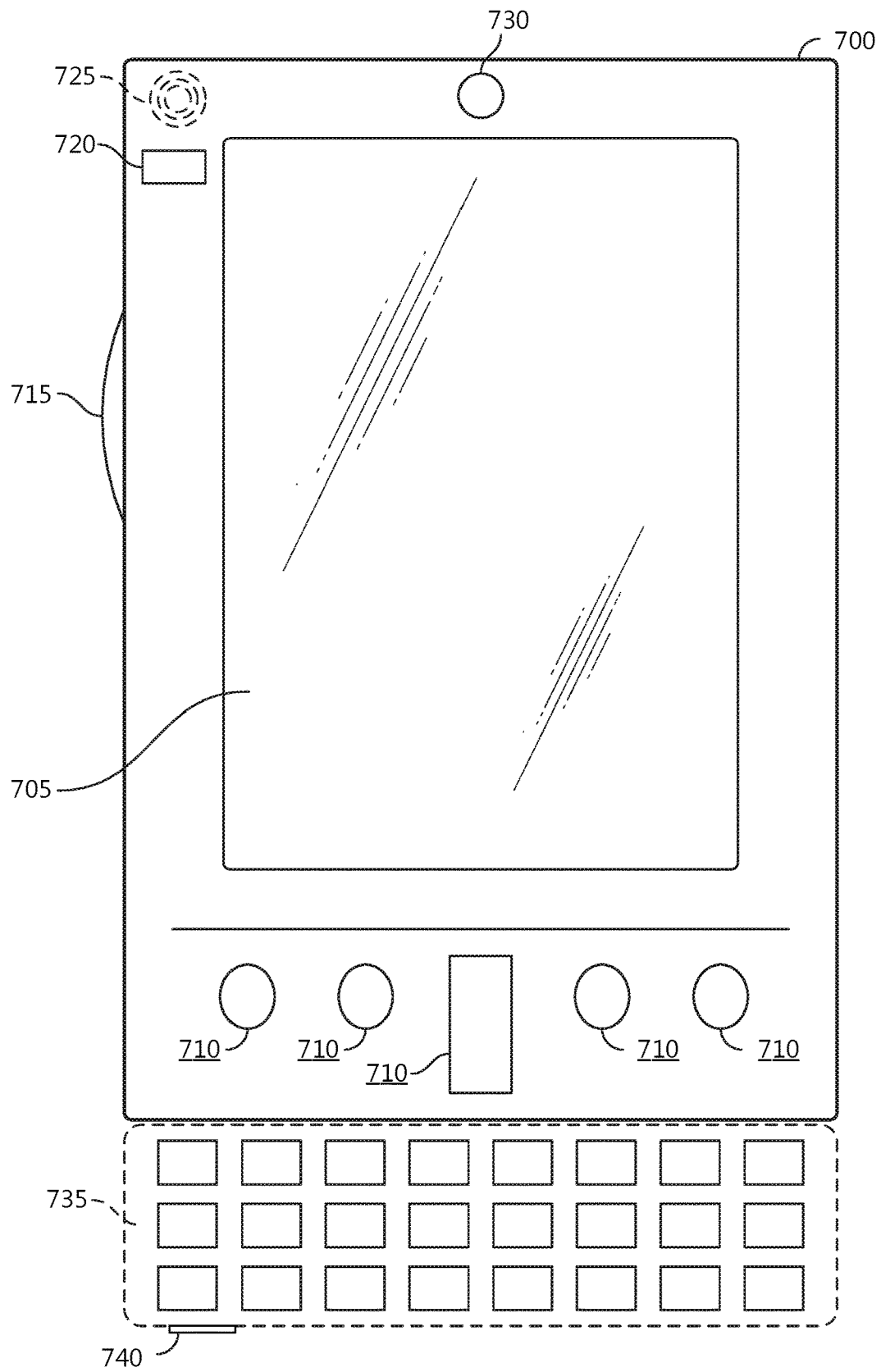
FIGS. 7A and 7B are block diagrams of a mobile computing device.
Figure 7B:
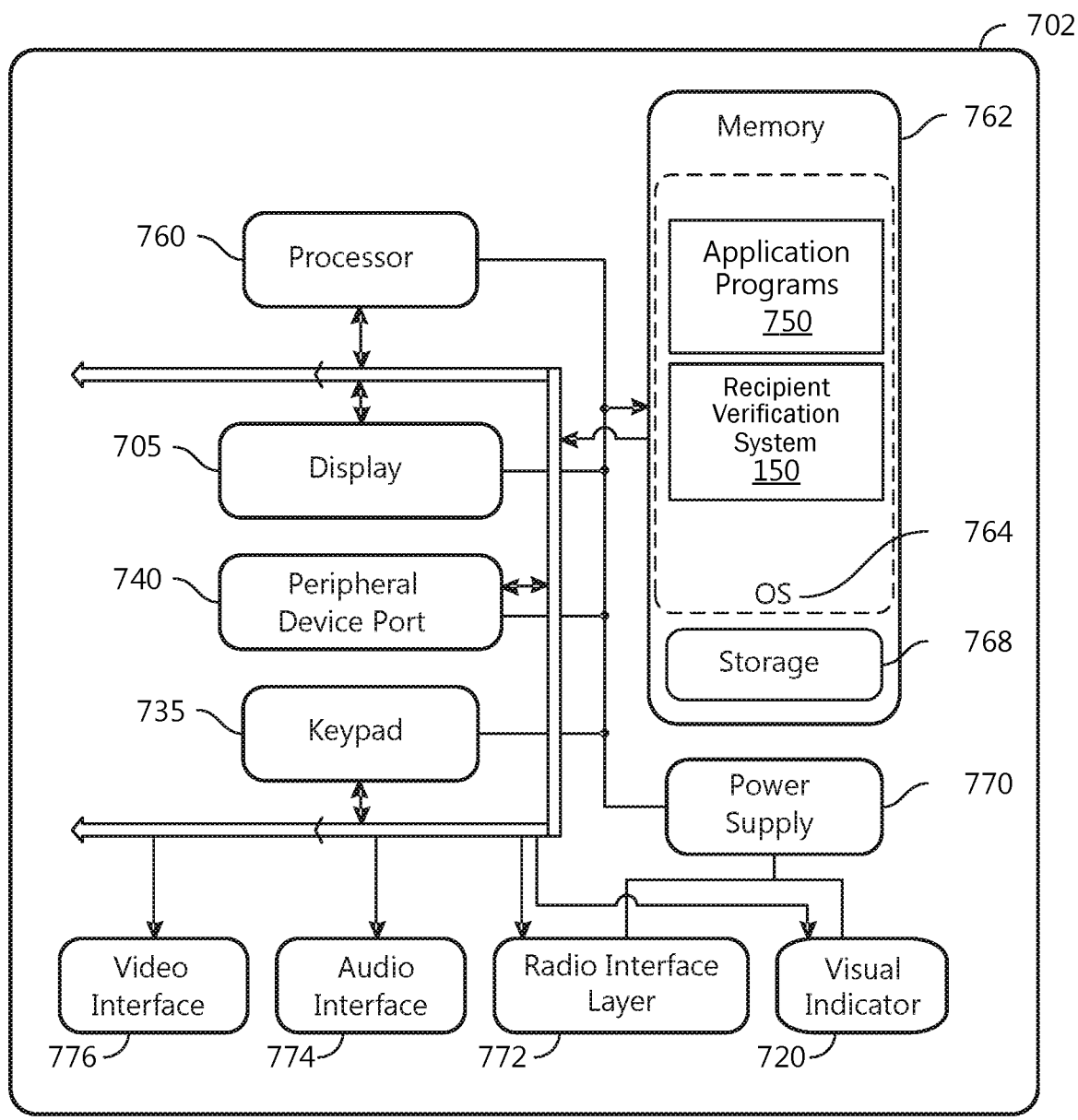
Figure 8:
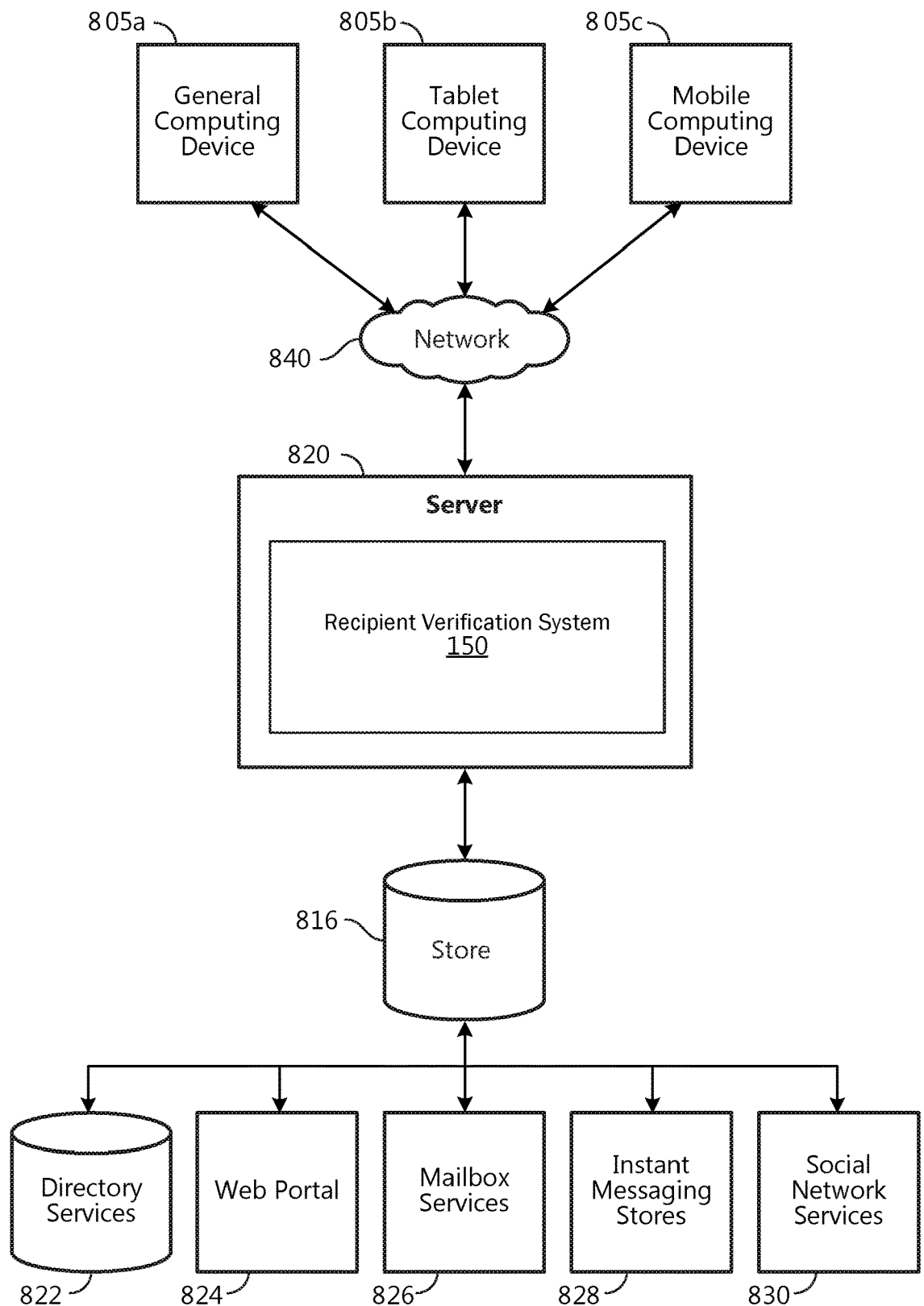
FIG. 8 is a block diagram of a distributed computing system.

FIGS. 6-8 and the associated descriptions provide a discussion of a variety of operating environments in which examples are practiced. However, the devices and systems illustrated and discussed with respect to FIGS. 6-8 are for purposes of example and illustration and are not limiting of a vast number of computing device configurations that are utilized for practicing aspects, described herein.

FIG. 6 is a block diagram illustrating physical components (i.e., hardware) of a computing device 600 with which examples of the present disclosure may be practiced. In a basic configuration, the computing device 600 includes at least one processing unit 602 and a system memory 604. According to an aspect, depending on the configuration and type of computing device, the system memory 604 comprises, but is not limited to, volatile storage (e.g., random access memory), non-volatile storage (e.g., read-only memory), flash memory, or any combination of such memories. According to an aspect, the system memory 604 includes an operating system 605 and one or more program modules 606 suitable for running software applications 650. According to an aspect, the system memory 604 includes recipient verification system 150. The operating system 605, for example, is suitable for controlling the operation of the computing device 600. Furthermore, aspects are practiced in conjunction with a graphics library, other operating systems, or any other application program, and are not limited to any particular application or system. This basic configuration is illustrated in FIG. 6 by those components within a dashed line 608. According to an aspect, the computing device 600 has additional features or functionality. For example, according to an aspect, the computing device 600 includes additional data storage devices (removable and/or non-removable) such as, for example, magnetic disks, optical disks, or tape. Such additional storage is illustrated in FIG. 6 by a removable storage device 609 and a non-removable storage device 610.

As stated above, according to an aspect, a number of program modules and data files are stored in the system memory 604. While executing on the processing unit 602, the program modules 606 (e.g., recipient verification system 150) perform processes including, but not limited to, one or more of the stages of the method 500 illustrated in FIG. 5. According to an aspect, other program modules are used in accordance with examples and include applications such as electronic mail and contacts applications, word processing applications, spreadsheet applications, database applications, slide presentation applications, drawing or computer-aided application programs, etc.

According to an aspect, aspects are practiced in an electrical circuit comprising discrete electronic elements, packaged or integrated electronic chips containing logic gates, a circuit utilizing a microprocessor, or on a single chip containing electronic elements or microprocessors. For example, aspects are practiced via a system-on-a-chip (SOC) where each or many of the components illustrated in FIG. 6 are integrated onto a single integrated circuit. According to an aspect, such an SOC device includes one or more processing units, graphics units, communications units, system virtualization units and various application functionality all of which are integrated (or "burned") onto the chip substrate as a single integrated circuit. When operating via an SOC, the functionality, described herein, is operated via application-specific logic integrated with other components of the computing device 600 on the single integrated circuit (chip). According to an aspect, aspects of the present disclosure are practiced using other technologies capable of performing logical operations such as, for example, AND, OR, and NOT, including but not limited to mechanical, optical, fluidic, and quantum technologies. In addition, aspects are practiced within a general purpose computer or in any other circuits or systems.

According to an aspect, the computing device 600 has one or more input device(s) 612 such as a keyboard, a mouse, a pen, a sound input device, a touch input device, etc. The output device(s) 614 such as a display, speakers, a printer, etc. are also included according to an aspect. The aforementioned devices are examples and others may be used. According to an aspect, the computing device 600 includes one or more communication connections 616 allowing communications with other computing devices 618. Examples of suitable communication connections 616 include, but are not limited to, radio frequency (RF) transmitter, receiver, and/or transceiver circuitry; universal serial bus (USB), parallel, and/or serial ports.

The term computer readable media, as used herein, includes computer storage media. Computer storage media include volatile and nonvolatile, removable and non-removable media implemented in any method or technology for storage of information, such as computer readable instructions, data structures, or program modules. The system memory 604, the removable storage device 609, and the non-removable storage device 610 are all computer storage media examples (i.e., memory storage.) According to an aspect, computer storage media include RAM, ROM, electrically erasable programmable read-only memory (EEPROM), flash memory or other memory technology, CD-ROM, digital versatile disks (DVD) or other optical storage, magnetic cassettes, magnetic tape, magnetic disk storage or other magnetic storage devices, or any other article of manufacture which can be used to store information and which can be accessed by the computing device 600. According to an aspect, any such computer storage media is part of the computing device 600. Computer storage media do not include a carrier wave or other propagated data signal.

According to an aspect, communication media are embodied by computer readable instructions, data structures, program modules, or other data in a modulated data signal, such as a carrier wave or other transport mechanism, and include any information delivery media. According to an aspect, the term "modulated data signal" describes a signal that has one or more characteristics set or changed in such a manner as to encode information in the signal. By way of example, and not limitation, communication media include wired media such as a wired network or direct-wired connection, and wireless media such as acoustic, radio frequency (RF), infrared, and other wireless media.

FIGS. 7A and 7B illustrate a mobile computing device 700, for example, a mobile telephone, a smart phone, a tablet personal computer, a laptop computer, and the like, with which aspects may be practiced. With reference to FIG. 7A, an example of a mobile computing device 700 for implementing the aspects is illustrated. In a basic configuration, the mobile computing device 700 is a handheld computer having both input elements and output elements. The mobile computing device 700 typically includes a display 705 and one or more input buttons 710 that allow the user to enter information into the mobile computing device 700. According to an aspect, the display 705 of the mobile computing device 700 functions as an input device (e.g., a touch screen display). If included, an optional side input element 715 allows further user input. According to an aspect, the side input element 715 is a rotary switch, a button, or any other type of manual input element. In alternative examples, mobile computing device 700 incorporates more or fewer input elements. For example, the display 705 may not be a touch screen in some examples. In alternative examples, the mobile computing device 700 is a portable phone system, such as a cellular phone. According to an aspect, the mobile computing device 700 includes an optional keypad 735. According to an aspect, the optional keypad 735 is a physical keypad. According to another aspect, the optional keypad 735 is a "soft" keypad generated on the touch screen display. In various aspects, the output elements include the display 705 for showing a graphical user interface (GUI), a visual indicator 720 (e.g., a light emitting diode), and/or an audio transducer 725 (e.g., a speaker). In some examples, the mobile computing device 700 incorporates a vibration transducer for providing the user with tactile feedback. In yet another example, the mobile computing device 700 incorporates input and/or output ports, such as an audio input (e.g., a microphone jack), an audio output (e.g., a headphone jack), and a video output (e.g., a HDMI port) for sending signals to or receiving signals from an external device. In yet another example, the mobile computing device 700 incorporates peripheral device port 740, such as an audio input (e.g., a microphone jack), an audio output (e.g., a headphone jack), and a video output (e.g., a HDMI port) for sending signals to or receiving signals from an external device.

FIG. 7B is a block diagram illustrating the architecture of one example of a mobile computing device. That is, the mobile computing device 700 incorporates a system (i.e., an architecture) 702 to implement some examples. In one example, the system 702 is implemented as a "smart phone" capable of running one or more applications (e.g., browser, e-mail, calendaring, contact managers, messaging clients, games, and media clients/players). In some examples, the system 702 is integrated as a computing device, such as an integrated personal digital assistant (PDA) and wireless phone.

According to an aspect, one or more application programs 750 are loaded into the memory 762 and run on or in association with the operating system 764. Examples of the application programs include phone dialer programs, e-mail programs, personal information management (PIM) programs, word processing programs, spreadsheet programs, Internet browser programs, messaging programs, and so forth. According to an aspect, recipient verification system 150 is loaded into memory 762. The system 702 also includes a non-volatile storage area 768 within the memory 762. The non-volatile storage area 768 is used to store persistent information that should not be lost if the system 702 is powered down. The application programs 750 may use and store information in the non-volatile storage area 768, such as e-mail or other messages used by an e-mail application, and the like. A synchronization application (not shown) also resides on the system 702 and is programmed to interact with a corresponding synchronization application resident on a host computer to keep the information stored in the non-volatile storage area 768 synchronized with corresponding information stored at the host computer. As should be appreciated, other applications may be loaded into the memory 762 and run on the mobile computing device 700.

According to an aspect, the system 702 has a power supply 770, which is implemented as one or more batteries. According to an aspect, the power supply 770 further includes an external power source, such as an AC adapter or a powered docking cradle that supplements or recharges the batteries.

According to an aspect, the system 702 includes a radio 772 that performs the function of transmitting and receiving radio frequency communications. The radio 772 facilitates wireless connectivity between the system 702 and the "outside world," via a communications carrier or service provider. Transmissions to and from the radio 772 are conducted under control of the operating system 764. In other words, communications received by the radio 772 may be disseminated to the application programs 750 via the operating system 764, and vice versa.

According to an aspect, the visual indicator 720 is used to provide visual notifications and/or an audio interface 774 is used for producing audible notifications via the audio transducer 725. In the illustrated example, the visual indicator 720 is a light emitting diode (LED) and the audio transducer 725 is a speaker. These devices may be directly coupled to the power supply 770 so that when activated, they remain on for a duration dictated by the notification mechanism even though the processor 760 and other components might shut down for conserving battery power. The LED may be programmed to remain on indefinitely until the user takes action to indicate the powered-on status of the device. The audio interface 774 is used to provide audible signals to and receive audible signals from the user. For example, in addition to being coupled to the audio transducer 725, the audio interface 774 may also be coupled to a microphone to receive audible input, such as to facilitate a telephone conversation. According to an aspect, the system 702 further includes a video interface 776 that enables an operation of an on-board camera 730 to record still images, video stream, and the like.

According to an aspect, a mobile computing device 700 implementing the system 702 has additional features or functionality. For example, the mobile computing device 700 includes additional data storage devices (removable and/or non-removable) such as, magnetic disks, optical disks, or tape. Such additional storage is illustrated in FIG. 7B by the non-volatile storage area 768.

According to an aspect, data/information generated or captured by the mobile computing device 700 and stored via the system 702 are stored locally on the mobile computing device 700, as described above. According to another aspect, the data are stored on any number of storage media that are accessible by the device via the radio 772 or via a wired connection between the mobile computing device 700 and a separate computing device associated with the mobile computing device 700, for example, a server computer in a distributed computing network, such as the Internet. As should be appreciated such data/information are accessible via the mobile computing device 700 via the radio 772 or via a distributed computing network. Similarly, according to an aspect, such data/information are readily transferred between computing devices for storage and use according to well-known data/information transfer and storage means, including electronic mail and collaborative data/information sharing systems.

FIG. 8 illustrates one example of the architecture of a system for conserving computation resources and reducing network bandwidth associated with salutation inaccuracies as described above. Content developed, interacted with, or edited in association with the recipient verification system 150 is enabled to be stored in different communication channels or other storage types. For example, various documents may be stored using a directory service 822, a web portal 824, a mailbox service 826, an instant messaging store 828, or a social networking site 830. The recipient verification system 150 is operative to use any of these types of systems or the like for conserving computation resources and reducing network bandwidth associated with salutation inaccuracies, as described herein. According to an aspect, a server 820 provides the recipient verification system 150 to clients 805a,b,c. As one example, the server 820 is a web server providing the recipient verification system 150 over the web. The server 820 provides the recipient verification system 150 over the web to clients 805 through a network 840. By way of example, the client computing device is implemented and embodied in a personal computer 805a, a tablet computing device 805b or a mobile computing device 805c (e.g., a smart phone), or other computing device. Any of these examples of the client computing device are operable to obtain content from the store 816.

Implementations, for example, are described above with reference to block diagrams and/or operational illustrations of methods, systems, and computer program products according to aspects. The functions/acts noted in the blocks may occur out of the order as shown in any flowchart. For example, two blocks shown in succession may in fact be executed substantially concurrently or the blocks may sometimes be executed in the reverse order, depending upon the functionality/acts involved.

The description and illustration of one or more examples provided in this application are not intended to limit or restrict the scope as claimed in any way. The aspects, examples, and details provided in this application are considered sufficient to convey possession and enable others to make and use the best mode. Implementations should not be construed as being limited to any aspect, example, or detail provided in this application. Regardless of whether shown and described in combination or separately, the various features (both structural and methodological) are intended to be selectively included or omitted to produce an example with a particular set of features. Having been provided with the description and illustration of the present application, one skilled in the art may envision variations, modifications, and alternate examples falling within the spirit of the broader aspects of the general inventive concept embodied in this application that do not depart from the broader scope.

I claim:

1. A method for providing recipient verification, comprising:
    receiving, at an email client executing on a computing device, a draft of an email message addressed to a recipient, wherein the email message includes an email address and a salutation; and
    in response to receiving an indication to send the email message, and prior to transmitting the email message:
        identifying, by the email client, the email address in the email message;
        identifying, by the email client, the salutation in the email message, wherein the salutation includes an honorific associated with a name of the recipient;
        determining, by the email client, whether the salutation is a verified salutation associated with the email address by verifying one or more of a gender of the honorific and a type of the honorific is appropriate for the recipient;
        when the salutation is verified, transmitting, by the email client, the email message;
        when the salutation is not verified, providing, by the email client, a notification to prompt correction of the salutation prior to transmitting the email message.

2. The method of claim 1, wherein providing, by the email client, the notification further comprises:
    displaying one or more verified salutations associated with the email address;
    receiving a selection of one of the one or more verified salutations;
    updating the email message to include the selected verified salutation; and
    sending the updated email message with the selected verified salutation.

3. The method of claim 1, further comprising:
    receiving, at the email client, a request to perform recipient verification.

4. The method of claim 3, wherein the request to perform recipient verification further comprises receiving, at the email client, a selection of a control function to initiate the recipient verification.

5. The method of claim 1, wherein determining, by the email client, whether the salutation is a verified salutation associated with the email address further comprises accessing a data source that includes additional contact information relating to one or more of the email address and the salutation.

6. The method of claim 1, wherein determining, by the email client, whether the salutation is a verified salutation associated with the email address further comprises accessing a global library that identifies a plurality of salutations, names, and nicknames to determine whether the salutation is verified for the email address.

7. The method of claim 1, wherein determining, by the email client, whether the salutation is a verified salutation associated with the email address further comprises accessing a user-defined library that identifies a plurality of user-defined salutations associated with one or more email addresses.

8. The method of claim 7, wherein the user-defined library stores the plurality of user-defined salutations associated with the one or more email addresses that were identified in email messages previously sent.

9. The method of claim 1, wherein determining, by the email client, whether the salutation is a verified salutation associated with the email address further comprises parsing previously received email messages for salutations associated with the email address.

10. The method of claim 1, wherein determining, by the email client, whether the salutation is a verified salutation associated with the email address further comprises interrogating third-party data sources to identify salutations associated with the email address.

11. The method of claim 10, wherein the third-party data sources include social media networks.

12. The method of claim 1, wherein determining, by the email client, whether the salutation is a verified salutation associated with the email address further comprises:
  accessing a data source that includes additional contact information relating to the email address or the salutation; and
  determining a masculinity attribute or a femininity attribute relating to the email address or the salutation.

13. A system for providing recipient verification, comprising:
  a processing unit; and
  a memory including computer readable instructions, which when executed by the processing unit, causes the system to be operable to:
    receive, at an email client executing on a computing device, a draft of an email message addressed to a recipient, wherein the email message includes an email address and a salutation; and
    in response to receiving an indication to send the email message, and prior to transmitting the email message:
      identify, by the email client, the email address in the email message;
      identify, by the email client, the salutation in the email message, wherein the salutation includes an honorific associated with a name of the recipient;
      determine, by the email client, whether the salutation is a verified salutation associated with the email address by verifying one or more of a gender of the honorific and a type of the honorific is appropriate for the recipient, the determination including interrogating a data source that includes additional contact information relating to the email address or the salutation;
      when the salutation is verified, transmit, by the email client, the email message;
      when the salutation is not verified, provide, by the email client, a notification that the salutation is not a verified salutation to prompt correction of the salutation prior to transmitting the email message.

14. The system of claim 13, wherein to provide, by the email client, the notification includes to:
  display one or more verified salutations associated with the email address;
  receive a selection of one of the one or more verified salutations;
  update the email message to include the selected verified salutation; and
  send the updated email message with the selected verified salutation.

15. The system of claim 13, wherein to determine, by the email client, whether the salutation is a verified salutation associated with the email address further comprises to:
  determine a masculinity attribute or a femininity attribute relating to the email address or the salutation.

16. The system of claim 13, wherein the data source includes third-party data sources such as a social media network.

17. The system of claim 13, wherein the data source includes a global library that identifies a plurality of salutations, names, and nicknames to determine whether the salutation is verified for the email address.

18. The system of claim 17, wherein the data source includes a user-defined library that identifies a plurality of user-defined salutations associated with one or more email addresses.

19. The system of claim 18, wherein the plurality of user-defined salutations include salutations identified in email messages previously sent.

20. A computer readable storage device including computer readable instructions, which when executed by a processing unit, performs steps for recipient verification, comprising:
  receiving, at an email client executing on a computing device, a draft of an email message addressed to a recipient, wherein the email message includes an email address and a salutation; and
  in response to receiving an indication to send the email message, and prior to transmitting the email message:
    identifying, by the email client, the email address in the email message;
    identifying, by the email client, the salutation in the email message, wherein the salutation includes an honorific associated with a name of the recipient;
    determining, by the email client, whether the salutation is a verified salutation associated with the email address by verifying one or more of a gender of the honorific and a type of the honorific is appropriate for the recipient, the determination including interrogating a data source that includes additional contact information relating to the email address or the salutation;
    when the salutation is verified:
      transmitting, by the email client, the email message;
    when the salutation is not verified:
      providing, by the email client, a notification that the salutation is not a verified salutation to prompt correction of the salutation prior to transmitting the email message;
      displaying, by the email client, one or more verified salutations associated with the email address within the notification;
      receiving, at the email client, a selection of one of the one or more verified salutations;
      updating, by the email client, the email message to include the selected verified salutation; and
      transmitting, by the email client, the updated email message with the selected verified salutation.

* * * * *